US008835031B2

(12) United States Patent
Lee et al.

(10) Patent No.: US 8,835,031 B2
(45) Date of Patent: Sep. 16, 2014

(54) RECHARGEABLE BATTERY

(71) Applicants: Samsung SDI Co., Ltd., Yongin-si (KR); Robert Bosch GmbH, Stuttgart (DE)

(72) Inventors: Chi-Young Lee, Yongin-si (KR); Joong-Heon Kim, Yongin-si (KR); Jong-Seok Moon, Yongin-si (KR); Jeong-Wan Haam, Yongin-si (KR); Hui-Jun Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 10 days.

(21) Appl. No.: 13/784,641

(22) Filed: Mar. 4, 2013

(65) Prior Publication Data

US 2014/0065449 A1 Mar. 6, 2014

(30) Foreign Application Priority Data

Sep. 4, 2012 (KR) ........................ 10-2012-0097884

(51) Int. Cl.
*H01M 10/50* (2006.01)

(52) U.S. Cl.
USPC .............................................. 429/62; 429/61

(58) Field of Classification Search
None
See application file for complete search history.

(56) References Cited

U.S. PATENT DOCUMENTS 6,977,343 B2   12/2005   Furuta et al.

FOREIGN PATENT DOCUMENTS

JP     3622676 B2    12/2004
JP     2005-044626 A  2/2005

OTHER PUBLICATIONS

Machine English Translation of JP 2005-044626 A, Patent Abstracts of Japan, 11 pages.

*Primary Examiner* — Cynthia K. Walls
(74) *Attorney, Agent, or Firm* — Christie, Parker & Hale, LLP

(57) ABSTRACT

A rechargeable battery including an electrode assembly including a negative electrode and a positive electrode; a case housing the electrode assembly; a cap plate coupled to an opening of the case; a negative terminal and a positive terminal penetrating the cap plate and connected to the negative electrode and the positive electrode, respectively; an external short-circuit unit separately provided between the negative terminal and the cap plate and configured to short-circuit the negative terminal on the cap plate; and a thermistor for connecting the positive terminal and the cap plate, wherein the thermistor is configured to have reduced resistance when its temperature is increased.

6 Claims, 4 Drawing Sheets

RECHARGEABLE BATTERY

CROSS-REFERENCE TO RELATED APPLICATION

This application claims priority to and the benefit of Korean Patent Application No. 10-2012-0097884 filed in the Korean Intellectual Property Office on Sep. 4, 2012, the entire contents of which are incorporated herein by reference.

BACKGROUND

1. Field

The described technology relates generally to a rechargeable battery for controlling charging resistance of a case depending on temperature for a perforation characteristic of a conductor.

2. Description of the Related Art

Unlike a primary battery that cannot be recharged, a rechargeable battery may be repeatedly charged and discharged. A small-capacity rechargeable battery is used for small portable electronic devices such as mobile phones, notebook computers, camcorders, and the like, while a large-capacity rechargeable battery is used as a motor-driving power source for hybrid vehicles and electric vehicles.

The rechargeable battery may include an electrode assembly having a positive electrode and a negative electrode provided on either side of a separator, a case accommodating the electrode assembly, a cap plate sealing an opening of the case, and an electrode terminal penetrating the cap plate and electrically connected to the electrode assembly.

When a conductive material penetrates the case of the rechargeable battery to pierce the electrode assembly, a high-voltage current flowing through the electrode terminal flows again toward the electrode assembly through the cap plate, the case, and the conductive material. If the amount of high-voltage current is large, the electrode assembly may be ignited or explode.

When a case is charged with a positive electrode in the rechargeable battery and charging resistance for connecting a positive terminal and a cap plate at room temperature is great, a current that flows to the electrode assembly through the case and the conductor is restricted when perforating the conductor so a possibility of ignition and explosion is reduced, but the charging resistance is low so the possibility of ignition and explosion is increased.

Also, when the charging resistor for connecting the positive terminal and the cap plate becomes lower in the overcharge and high temperature condition, an external short circuit by an external short-circuit unit provided between the negative terminal and the cap plate becomes easier but it cannot reduce the predetermined charging resistor so the external short circuit becomes difficult.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery for improving a perforation characteristic of a conductor by controlling charging resistance of a case according to temperature.

An exemplary embodiment provides a rechargeable battery including: an electrode assembly including a negative electrode and a positive electrode; a case for receiving the electrode assembly; a cap plate combined to an opening of the case; a negative terminal and a positive terminal penetrating the cap plate and connected to the negative electrode and the positive electrode; an external short-circuit unit separately provided between the negative terminal and the cap plate and short-circuiting the negative terminal on the cap plate; and a thermistor for connecting the positive terminal and the cap plate, resistance thereof being reduced when temperature is increased.

The thermistor has resistance of 1 mohm to 100 ohm at 25° C. and 0.1 mohm to 10 ohm at 60° C.

The external short-circuit unit includes a short-circuit tab and a short-circuit member that are separated or short-circuited according to an internal pressure, the short-circuit tab is disposed outside the cap plate in an insulated state and is electrically connected to the negative terminal, and the short-circuit member is installed in a short-circuit hole formed in the cap plate facing the short-circuit tab.

The rechargeable battery further includes: a metal support plate electrically connected to the negative electrode and disposed on at least one side of the electrode assembly; a first insulation member provided between the electrode assembly and the metal support plate; and a second insulation member provided between the metal support plate and the case.

The positive terminal includes: a rivet terminal installed in a terminal hole of the cap plate; and a plate terminal disposed outside the cap plate and connected to the rivet terminal, and the thermistor is provided between the plate terminal and the cap plate and perforates the rivet terminal.

A gasket provided between the terminal hole and the rivet terminal is extended between the rivet terminal and the thermistor to have an insulation configuration.

According to the embodiment, the positive terminal and the cap plate are connected through the thermistor so the perforation characteristic of the conductor is improved by controlling the charging resistance of the case connected to the cap plate according to the temperature.

For example, resistance of the thermistor is increased at room temperature at which the rechargeable battery is normally operable to control the current that flows to the electrode assembly through the case and the conductor and increase safety of conductor perforation, and the resistance of the thermistor is reduced through overcharging at a high temperature to allow fluent external short circuit operation by the external short-circuit unit provided between the negative terminal and the cap plate.

DETAILED DESCRIPTION

Figure 1:
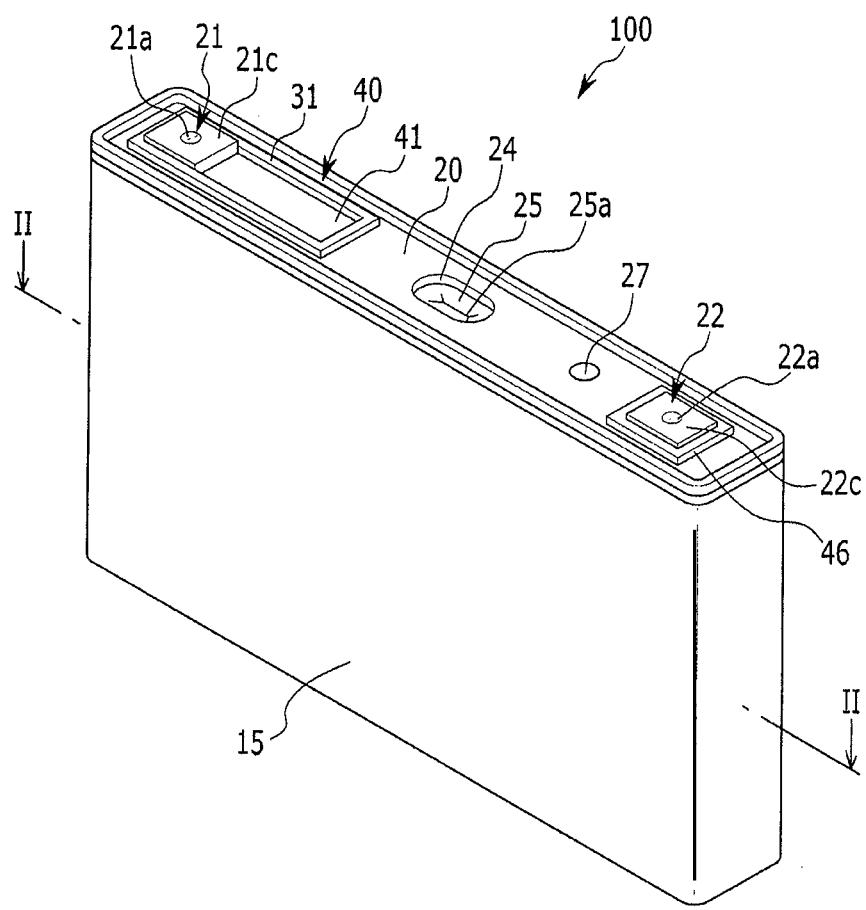
FIG. 1 shows a perspective view of a rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
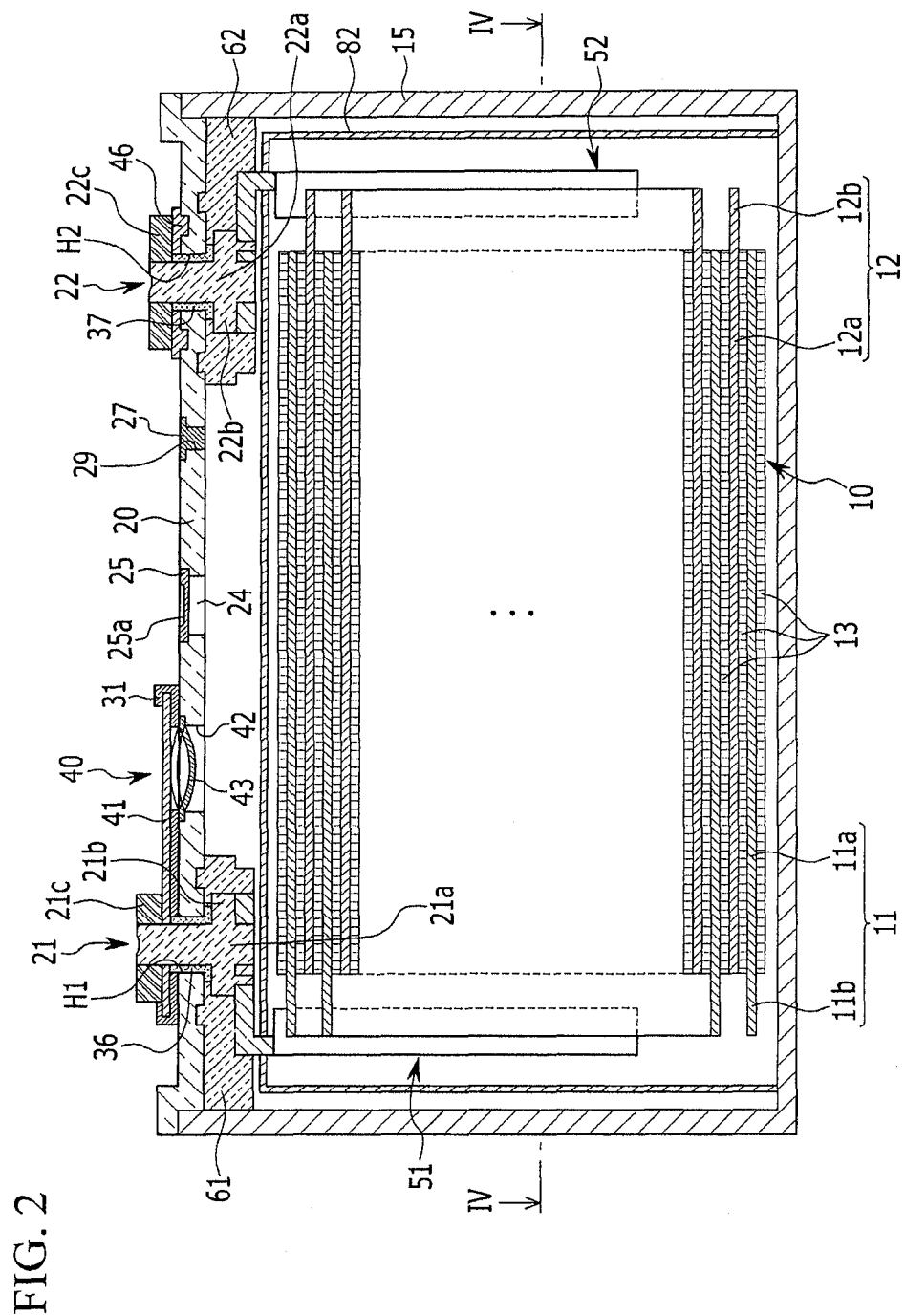
FIG. 2 shows a cross-sectional view with respect to a line II-II of FIG. 1.

FIG. 1 shows a perspective view of a rechargeable battery according to an exemplary embodiment of the present invention, and FIG. 2 shows a cross-sectional view with respect to a line II-II of FIG. 1. Referring to FIG. 1 and FIG. 2, the rechargeable battery 100 includes an electrode assembly 10 for charging and discharging a current, a case 15 for receiving the electrode assembly 10, a cap plate 20 combined to an opening of the case 15, a first electrode terminal (hereinafter, a negative terminal) 21 and a second electrode terminal (hereinafter, a positive terminal) 22 installed on the cap plate 20, and an external short-circuit unit 40 provided to the negative terminal 21.

For example, the electrode assembly 10 is formed by disposing a first electrode (hereinafter, a negative electrode) 11 and a second electrode (hereinafter, a positive electrode) 12 on respective sides of a separator 13, i.e., an insulator, and winding the negative electrode 11, the separator 13, and the positive electrode 12 as a jellyroll.

Also, the electrode assembly may be assembled by laminating a negative electrode and a positive electrode each of which is formed by a single plate with the separator located therebetween, or by bending and laminating the negative electrode, the separator, and the positive electrode in a zigzag form.

The negative electrode 11 and the positive electrode 12 include coated regions 11a and 12a that are formed by applying an active material to a current collector on a metal plate, and uncoated regions 11b and 12b that are formed without application of the active material thereto.

The uncoated region 11b of the negative electrode 11 is formed at an end of the negative electrode 11 along the spirally wound negative electrode 11. The uncoated region 12b of the positive electrode 12 is formed at an end of the positive electrode 12 along the spirally wound positive electrode 12. The uncoated regions 11b and 12b are located on respective ends of the electrode assembly 10.

In one embodiment, the case 15 is formed to be cuboidal so as to provide a space for receiving the electrode assembly 10 and an electrolyte solution, and an opening for communicating the outside and the inner space on one side of the cuboid. The opening allows the electrode assembly 10 to be inserted inside the case 15.

The cap plate 20 is installed in the opening of the case 15 to close and seal the case 15. In one embodiment, the case 15 and the cap plate 20 can be made of aluminum and may be welded to each other.

Also, the cap plate 20 includes an electrolyte injection opening 29, a vent hole 24, and terminal holes H1 and H2. The electrolyte injection opening 29 places the outside of the cap plate 20 and the inside of the case 15 in fluid communication to allow the electrolyte solution to be injected into the case 15. After the electrolyte solution is injected, the electrolyte injection opening 29 is sealed with a sealing cap 27.

The vent hole 24 is closed and sealed by a vent plate 25 so as to discharge an internal pressure of a rechargeable battery. When the internal pressure of the rechargeable battery reaches a predetermined pressure, the vent plate 25 is incised to open the vent hole 24. The vent plate 25 includes a notch 25a for generating an incision.

The negative terminal 21 and the positive terminal 22 are installed in the terminal holes H1 and H2 of the cap plate 20 and are electrically connected to the electrode assembly 10. That is, the negative terminal 21 is electrically connected to the negative electrode 11 of the electrode assembly 10, and the positive terminal 22 is electrically connected to the positive electrode 12 of the electrode assembly 10. Therefore, the electrode assembly 10 is drawn out to the outside of the case 15 through the negative terminal 21 and the positive terminal 22.

The negative terminal 21 and the positive terminal 22 form the same configuration inside the cap plate 20, and they form different configurations outside the cap plate 20, which will now be described.

The negative and positive terminals 21 and 22 include rivet terminals 21a and 22a installed in the terminal holes H1 and H2 of the cap plate 20, flanges 21b and 22b widely formed as a single body on the rivet terminals 21a and 22a inside the cap plate 20, and plate terminals 21c and 22c located outside the cap plate 20 and connected to the rivet terminals 21a and 22a through riveting or welding.

Negative and positive gaskets 36 and 37 are installed between the rivet terminals 21a and 22a of the negative and positive terminals 21 and 22 and the insides of the terminal holes H1 and H2 of the cap plate 20 to seal and electrically insulate a space between the rivet terminals 21a and 22a of the negative and positive terminals 21 and 22 and the cap plate 20.

The negative and positive gaskets 36 and 37 are extended to be installed between the flanges 21b and 22b and the inside of the cap plate 20 to further seal and electrically insulate the space between the flanges 21b and 22b and the cap plate 20. That is, the negative and positive gaskets 36 and 37 prevent an electrolyte solution from being leaked through the terminal holes H1 and H2 when installing the negative and positive terminals 21 and 22 in the cap plate 20.

Negative and positive lead tabs 51 and 52 electrically connect the negative and positive terminals 21 and 22 to the negative and positive electrodes 11 and 12 of the electrode assembly 10. That is, the negative and positive lead tabs 51 and 52 are combined to bottoms of the rivet terminals 21a and 22a and the bottoms are caulked so that the negative and positive electrode lead tabs 51 and 52 are supported by the flanges 21b and 22b and are connected to the rivet terminals 21a and 22a.

Negative and positive insulation members 61 and 62 are installed between the negative and positive electrode lead tabs 51 and 52 and the cap plate 20 to electrically insulate the negative and positive electrode lead tabs 51 and 52 from the cap plate 20. Further, the negative and positive electrode insulating members 61 and 62 are combined to the cap plate 20 on a first end and wrap the negative and positive electrode lead tabs 51 and 52, the rivet terminals 21a and 22a, and the flanges 21b and 22b thereby stabilizing their connection structure.

The external short-circuit unit 40 will now be described with regard to a plate terminal 21c of the negative terminal 21 and a thermistor 46 with regard to a plate terminal 22c of the positive terminal 22.

The external short-circuit unit 40 of the negative terminal 21 includes a short-circuit tab 41 and a short-circuit member 43 that are separated or short-circuited according to an internal pressure. The short-circuit tab 41 is electrically connected to the rivet terminal 21a of the negative terminal 21, is provided with an insulation member 31, and is located on the outside of the cap plate 20.

The insulation member 31 is installed between the short-circuit tab 41 and the cap plate 20 to electrically insulate the short-circuit tab 41 and the cap plate 20. That is, the cap plate 20 maintains electrical insulation from the negative terminal 21.

The short-circuit tab 41 and the plate terminal 21*c* are combined to an upper portion of the rivet terminal 21*a* to caulk the upper portion so the short-circuit tab 41 and the plate terminal 21*c* are combined to the upper portion of the rivet terminal 21*a*. Therefore, the short-circuit tab 41 and the plate terminal 21*c* are fixed to the cap plate 20 with the provision of the insulation member 31.

The short-circuit member 43 is installed in a short-circuit hole 42 formed in the cap plate 20. The short-circuit tab 41 is connected to the negative terminal 21 and is extended along an outer part of the short-circuit member 43. Therefore, the short-circuit tab 41 and the short-circuit member 43 correspond to the short-circuit hole 42, they face each other to maintain a solid line state, and when internal pressure of the rechargeable battery is increased, the short circuit state (imaginary line state) is formed by inversion of the short-circuit member 43.

The thermistor 46 on the side of the positive terminal 22 electrically connects the plate terminal 22*c* of the positive terminal 22 and the cap plate 20, and resistance is changed according to the temperature of the rechargeable battery. For example, the thermistor 46 can be formed with a negative temperature coefficient (NTC) thermistor having resistance that is reduced when the temperature is increased.

For example, when the rechargeable battery is normally operated, that is, when the rechargeable battery is operated at room temperature, the thermistor 46 maintains high resistance. When the resistance of the thermistor 46 is high, the current is controlled to flow between the positive terminal 22 and the cap plate 20, and the current flowing to the electrode assembly 10 through the case 15 and the conductor is controlled to thus increase safety on perforation of the conductor (by, for example, a nail).

When the rechargeable battery is overcharged, that is, when the temperature of the rechargeable battery is increased, resistance of the thermistor 46 is reduced. When the resistance of the thermistor 46 is reduced, the current easily flows between the positive terminal 22 and the cap plate 20 so the external short-circuit operation of the external short-circuit unit 40 between the negative terminal 21 and the cap plate 20 performs suitably.

For example, the thermistor 46 has resistance of about 1 mohm to about 100 ohm at room temperature between about 15 to about 35° C. (for example, about 25° C.), and it has resistance of about 0.1 mohm to about 10 ohm at a high temperature from about 50 to about 70° C. (for example, about 60° C.).

For example, the thermistor 46 is provided between the plate terminal 22*c* and the cap plate 20 and penetrates the rivet terminal 22*a*. Therefore, the thermistor 46 and the plate terminal 22*c* are combined to an upper portion of the rivet terminal 22*a* to caulk the upper portion so the thermistor 46 and the plate terminal 22*c* are combined to the upper portion of the rivet terminal 22*a*.

The plate terminal 22*c* is installed outside the cap plate 20 while being provided with the thermistor 46. That is, the plate terminal 22*c* is connected as a variable resistor to the cap plate 20 through the thermistor 46 having resistance that is variable by the temperature. Resistance of the thermistor 46 can be set according to a thickness that is set between the plate terminal 22*c* and the cap plate 20.

The positive gasket 37 is extended between the rivet terminal 22*a* and the thermistor 46. That is, the positive gasket 37 prevents direct electrical connection of the rivet terminal 22*a* and the thermistor 46. That is, the rivet terminal 22*a* is electrically connected to the thermistor 46 through the plate terminal 22*c*.

Figure 3:
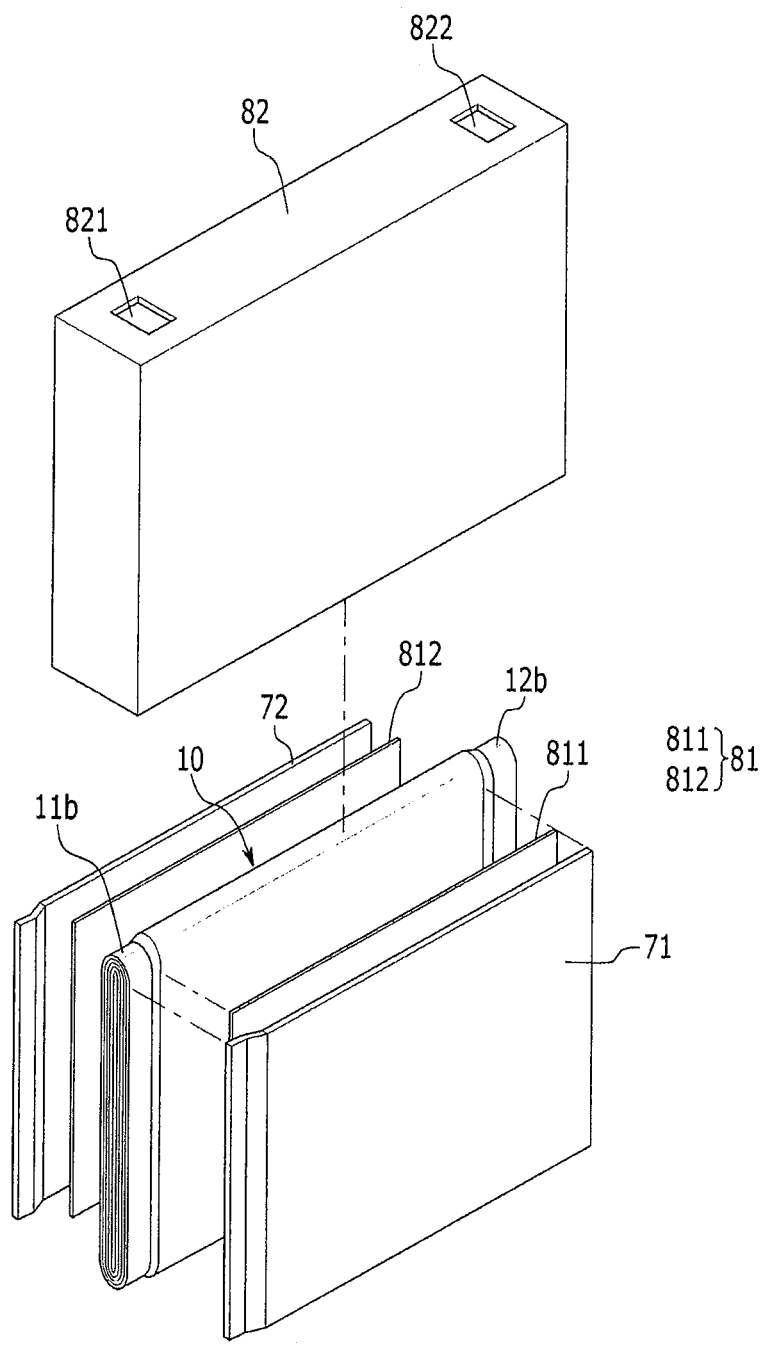
FIG. 3 shows an exploded perspective view of an electrode assembly, a first insulation member, a metal support plate, and a second insulation member.
Figure 4:
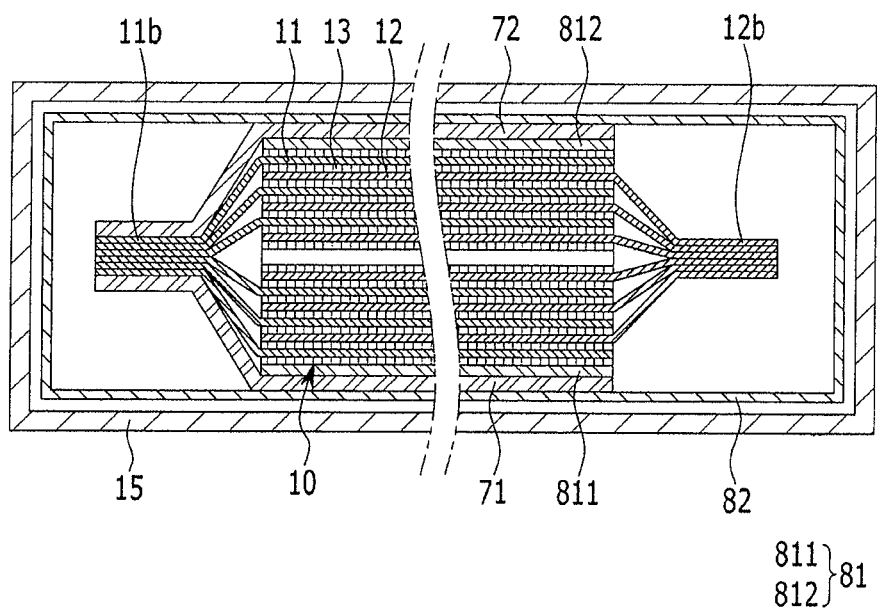
FIG. 4 shows a cross-sectional view with respect to a line IV-IV of FIG. 2.

FIG. 3 shows an exploded perspective view of an electrode assembly, a first insulation member, a metal support plate, and a second insulation member, and FIG. 4 shows a cross-sectional view with respect to a line IV-IV of FIG. 2. Referring to FIG. 3 and FIG. 4, the rechargeable battery includes metal support plates 71 and 72 that are provided between the electrode assembly 10 and the case 15 as an insulating configuration.

The metal support plates 71 and 72 are provided on respective sides of the electrode assembly 10 in the present exemplary embodiment, and they can be located on either side thereof. For the insulating configuration of the metal support plates 71 and 72, a first insulation member 81 and a second insulation member 82 are located on both ends of the metal support plates 71 and 72.

The metal support plates 71 and 72 are provided between the electrode assembly 10 and the case 15 so that they may cause a short circuit outside the electrode assembly 10 before the electrode assembly 10 is short-circuited inside them when the conductor is perforated. For this purpose, the metal support plates 71 and 72 are electrically connected to the negative electrode 11 of the electrode assembly 10 and have negative polarity.

The metal support plates 71 and 72 are bent along the uncoated region 11*b* of the negative electrode 11 of the electrode assembly 10 and are connected to the uncoated region 11*b*. In this case, the negative electrode lead tab can be connected to the uncoated region, or it can also be connected to the metal support plate so that it may be connected to the uncoated region through the metal support plate.

For example, the conductor can perforate the case 15 and then the electrode assembly 10. In this instance, the metal support plates 71 and 72 located between the case 15 and the electrode assembly 10 generate a short circuit outside the electrode assembly 10 before they generate a short circuit inside the electrode assembly 10. The voltage charged into the electrode assembly 10 is passed through the case 15, the conductor, and the metal support plates 71 and 72 and is quickly reduced outside the electrode assembly 10.

The first insulation member 81 is located between the electrode assembly 10 and the metal support plate 71 and 72 to form an insulation configuration. That is, the first insulation member 81 includes an insulation plate 811 located between the metal support plate 71 and a first side of the electrode assembly 10, and an insulation plate 812 located between the metal support plate 72 and a second side of the electrode assembly 10 and forming an insulation configuration.

The second insulation member 82 is located between the metal support plates 71 and 72 and the case 15 to form an insulation configuration. The top of the second insulation member 82 is closed so as to insulate the tops of the metal support plate 71 and 72 from the cap plate 20. Therefore, the second insulation member 82 includes outlets 821 and 822 for drawing out the negative and positive lead tabs 51 and 52 at the top.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly including a negative electrode and a positive electrode;
a case housing the electrode assembly;
a cap plate coupled to an opening of the case;
a negative terminal and a positive terminal penetrating the cap plate and connected to the negative electrode and the positive electrode, respectively;
an external short-circuit unit separately provided between the negative terminal and the cap plate and configured to short-circuit the negative terminal on the cap plate; and
a thermistor for connecting the positive terminal and the cap plate, wherein the thermistor is configured to have reduced resistance when its temperature is increased.

2. The rechargeable battery of claim 1, wherein the thermistor has a resistance of about 1 mohm to about 100 ohm at about 25° C. and about 0.1 mohm to about 10 ohm at about 60° C.

3. The rechargeable battery of claim 1, wherein the external short-circuit unit includes a short-circuit tab and a short-circuit member that are separated and configured to be short-circuited together at a predetermined internal pressure, wherein the short-circuit tab is located outside the cap plate in an insulated state and is electrically connected to the negative terminal, and
wherein the short-circuit member is in a short-circuit hole in the cap plate and faces the short-circuit tab.

4. The rechargeable battery of claim 1, further including:
a metal support plate electrically connected to the negative electrode and located on at least one side of the electrode assembly;
a first insulation member located between the electrode assembly and the metal support plate; and
a second insulation member located between the metal support plate and the case.

5. The rechargeable battery of claim 1, wherein the positive terminal includes:
a rivet terminal in a terminal hole of the cap plate; and
a plate terminal located outside the cap plate and connected to the rivet terminal, wherein the thermistor is located between the plate terminal and the cap plate and perforates the rivet terminal.

6. The rechargeable battery of claim 5, wherein a gasket located between the terminal hole and the rivet terminal extends between the rivet terminal and the thermistor.

* * * * *